(12) United States Patent
Doi et al.

(10) Patent No.: US 12,305,674 B2
(45) Date of Patent: May 20, 2025

(54) HIGH-PRESSURE FLUID DISCHARGE DEVICE

(71) Applicant: SMC CORPORATION, Chiyoda-ku (JP)

(72) Inventors: Yoshitada Doi, Koshigaya (JP); Masayuki Oshima, Tsukuba (JP); Hiroaki Sasaki, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 583 days.

(21) Appl. No.: 17/603,375

(22) PCT Filed: Feb. 17, 2020

(86) PCT No.: PCT/JP2020/005987
§ 371 (c)(1),
(2) Date: Oct. 13, 2021

(87) PCT Pub. No.: WO2020/213248
PCT Pub. Date: Oct. 22, 2020

(65) Prior Publication Data
US 2022/0205467 A1 Jun. 30, 2022

(30) Foreign Application Priority Data

Apr. 18, 2019 (JP) ................................ 2019-079011
Oct. 31, 2019 (JP) ................................ 2019-198077

(51) Int. Cl.
*F15B 21/12* (2006.01)
*B05B 1/32* (2006.01)
(Continued)

(52) U.S. Cl.
CPC ............... *F15B 21/12* (2013.01); *B05B 1/32* (2013.01); *B05B 9/03* (2013.01); *F16K 7/17* (2013.01); *F16K 31/126* (2013.01); *F16K 31/385* (2013.01)

(58) Field of Classification Search
CPC ... F15B 21/12; B05B 1/32; B05B 9/03; F16K 7/17; F16K 31/126; F16K 31/385;
(Continued)

(56) References Cited

U.S. PATENT DOCUMENTS 4,284,260 A * 8/1981 Baranoff ................... E03D 3/02
251/45
5,169,117 A 12/1992 Huang
(Continued)

FOREIGN PATENT DOCUMENTS

EP 0 811 795 A2 12/1997
EP 2 518 332 A1 10/2012
(Continued)

OTHER PUBLICATIONS

Combined Chinese Office Action and Search Report issued Jun. 10, 2022 in Chinese Patent Application No. 202080029559.0 (with unedited computer generated English translation), 13 pages.
(Continued)

*Primary Examiner* — Qingzhang Zhou
*Assistant Examiner* — Kevin Edward Schwartz
(74) *Attorney, Agent, or Firm* — Oblon, McClelland, Maier & Neustadt, L.L.P.

(57) ABSTRACT

A high-pressure fluid discharge device has an input port through which a high-pressure fluid is fed, a tank chamber which stores the high-pressure fluid, and a discharge port through which the high-pressure fluid is discharged. A diaphragm valve divides a pilot chamber and a valve chamber communicating with the tank chamber; the pilot chamber communicates with the valve chamber through a pilot passage; the valve chamber communicates with the discharge port through a discharge passage while the diaphragm valve is open; an opening-closing control valve is provided in open flow paths for opening the pilot chamber to the discharge passage; and the opening-closing control valve is opened and closed by the pressure of the fluid fed from the tank chamber.

7 Claims, 9 Drawing Sheets

(51) Int. Cl.
  *B05B 9/03* (2006.01)
  *F16K 7/17* (2006.01)
  *F16K 31/126* (2006.01)
  *F16K 31/385* (2006.01)

(58) Field of Classification Search
  CPC .............. F16K 31/3855; F16K 31/365; G05D 16/0647; G05D 16/16; G05D 16/163
  USPC ................. 239/337; 137/489, 492, 492.5
  See application file for complete search history.

(56) References Cited

U.S. PATENT DOCUMENTS

| | | | | |
|---|---|---|---|---|
| 6,332,475 | B1* | 12/2001 | Brougham | F16K 31/385 137/430 |
| 6,755,114 | B2* | 6/2004 | Onoe | B65D 88/706 91/275 |
| 6,780,170 | B2* | 8/2004 | Fago | A61M 31/005 604/150 |
| 2003/0017012 | A1 | 1/2003 | Onoe | |
| 2005/0178989 | A1* | 8/2005 | Stern | F16K 31/404 251/30.03 |
| 2007/0228069 | A1* | 10/2007 | Onoe | B65D 88/703 222/14 |
| 2017/0218601 | A1* | 8/2017 | Burrows | E03B 1/00 |

FOREIGN PATENT DOCUMENTS

| | | |
|---|---|---|
| GB | 2 091 451 A | 7/1982 |
| JP | 2003-34429 A | 2/2003 |
| JP | 2014-83518 A | 5/2014 |

OTHER PUBLICATIONS

Extended European Search Report issued on Dec. 19, 2022 in European Application No. 20791581.0, 9 pages.
International Search Report mailed on May 12, 2020 in PCT/JP2020/005987 filed on Feb. 17, 2020 (3 pages).
Korean Office Action issued Feb. 27, 2024 in Korean Patent Application No. 10-2021-7036901 (with unedited computer-generated English translation), 10 pages.

* cited by examiner

HIGH-PRESSURE FLUID DISCHARGE DEVICE

TECHNICAL FIELD

The present invention relates to a high-pressure fluid discharge device that discharges high-pressure fluid.

BACKGROUND ART

For example, in order to remove cutting chips adhering to a surface of a workpiece during machining and clean the surface of the workpiece, a device that blows high-pressure fluid such as high-pressure air against the surface is used.

JP 2014-083518 A discloses an intermittent air blow gun used for such applications. In this intermittent air blow gun, when the operator grips the switch lever, the on-off valve of the air discharge channel is opened, and air from the compressed air source is discharged from the nozzle. At the same time, a portion of the air flowing through the air discharge channel is supplied to the pilot valve, and when the pilot valve opens, a portion of the air from the compressed air source is sent to the secondary side of the on-off valve through the bypass channel, and the on-off valve closes.

SUMMARY OF INVENTION

However, in order to discharge air by such an air blow gun, it is necessary for the operator to grip the lever and operate the air blow gun at a work site. For example, when the air blow gun needs to be operated at a place where water droplets are scattered, there is a problem that the operator gets wet.

The present invention has been made in consideration the above situation, and an object of the present invention is to provide a high-pressure fluid discharge device which is capable of intermittently discharging a high-pressure fluid without the need of an operator directly and manually operating the device.

A high-pressure fluid discharge device according to the present invention includes an inlet port to which a high-pressure fluid is supplied, a tank chamber that stores the high-pressure fluid, and a discharge port that discharges the high-pressure fluid. The high-pressure fluid discharge device further includes a diaphragm valve that separates a pilot chamber and a valve chamber communicating with the tank chamber. The pilot chamber communicates with the valve chamber through a pilot passage. When the diaphragm valve opens, the valve chamber communicates with the discharge port through a discharge passage. An opening and closing control valve is provided in a release flow path that opens the pilot chamber to the discharge passage. The opening and closing control valve is operated to open and close by a pressure of the fluid supplied from the tank chamber.

According to the above-described high-pressure fluid discharge device, fluid having a high peak pressure can be periodically discharged from the discharge port merely by supplying a high-pressure fluid from the inlet port.

The high-pressure fluid discharge device according to the present invention includes a diaphragm valve that separates a pilot chamber and a valve chamber communicating with the tank chamber. An opening and closing control valve that opens the pilot chamber to the discharge passage is operated to open and close by a pressure of the fluid supplied from the tank chamber. Therefore, a fluid having a high peak pressure can be periodically discharged merely by supplying the high-pressure fluid from the inlet port.

DESCRIPTION OF EMBODIMENTS

Figure 1:
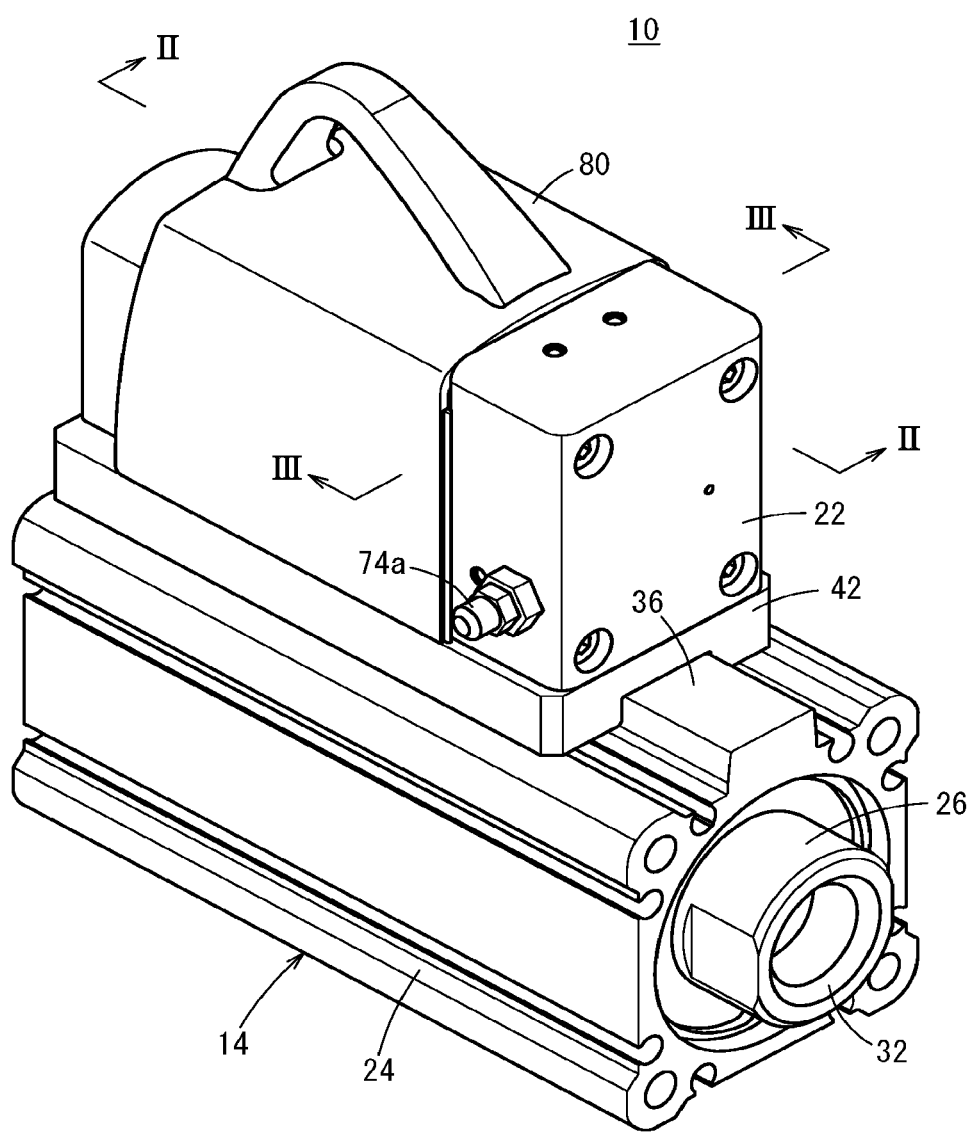
FIG. 1 is a perspective view of a high-pressure fluid discharge device according to a first embodiment of the present invention.

A high-pressure fluid discharge device of the present invention will be described below with reference to the accompanying drawings, while giving several suitable embodiments. In the following description, the terms "up", "down", "left", and "right" refer to directions in the drawings for the sake of convenience, and do not limit the actual arrangement of devices or the like.

First Embodiment

Figure 2:
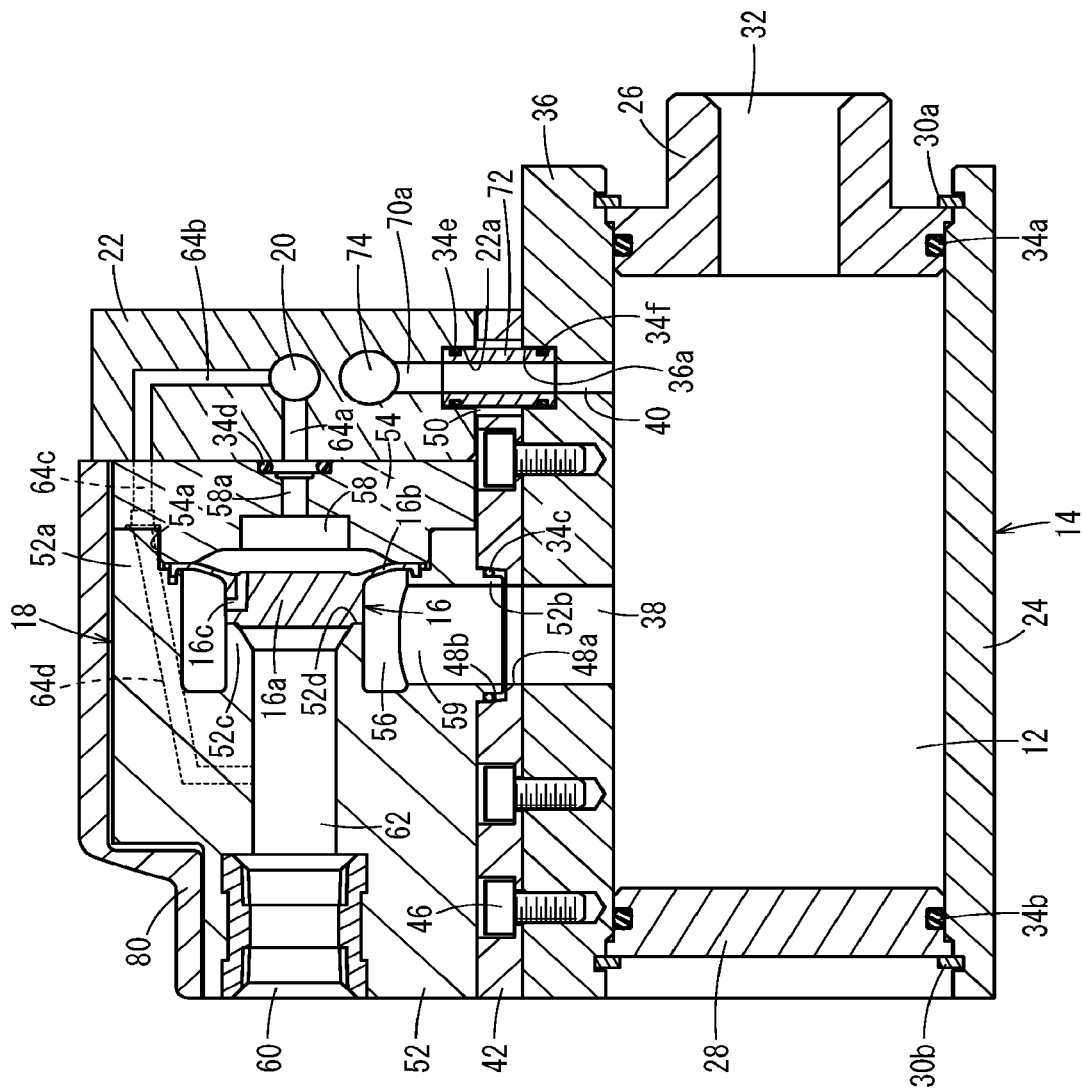
FIG. 2 is a cross-sectional view taken along line II-II of the high-pressure fluid discharge device of FIG. 1.
Figure 3:
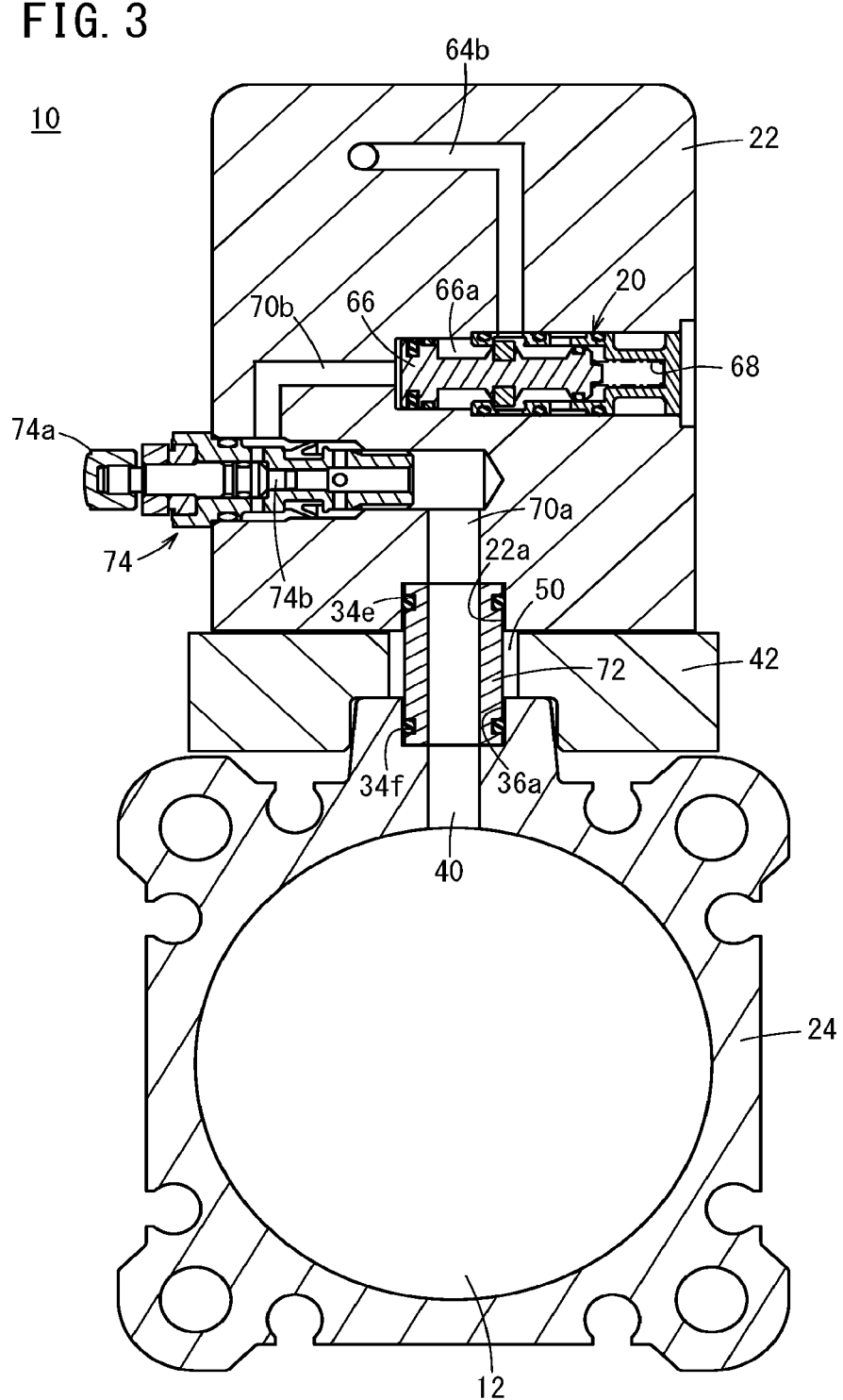
FIG. 3 is a cross-sectional view taken along line III-III of the high-pressure fluid discharge device of FIG. 1.

A high-pressure fluid discharge device 10 according to a first embodiment of the present invention will be described with reference to FIGS. 1 to 7. As shown in FIGS. 2 and 3, the high-pressure fluid discharge device 10 includes a tank housing 14 having a tank chamber 12 therein, a diaphragm housing 18 having a diaphragm valve 16 therein, and a control housing 22 having an opening and closing control valve 20 therein. The high-pressure fluid discharge device 10 is used for removing cutting chips or the like.

The tank housing 14 includes a quadrangular tubular cylinder tube 24, a cylindrical inlet cover 26, and a disk-shaped end cover 28. The inlet cover 26 is attached to one end side of the cylinder tube 24 via a C-ring 30a, and includes an inlet port 32 penetrating in the axial direction. The end cover 28 is attached to the other end side of the cylinder tube 24 via a C-ring 30b, and closes the other end side of the cylinder tube 24.

The tank chamber 12 that stores high-pressure air (high-pressure fluid) supplied from the inlet port 32 is formed inside the cylinder tube 24. A seal member 34a for sealing between the inlet cover 26 and the cylinder tube 24 is attached to the outer peripheral surface of the inlet cover 26.

A seal member 34b for sealing between the end cover 28 and the cylinder tube 24 is attached to the outer peripheral surface of the end cover 28.

Figure 4:
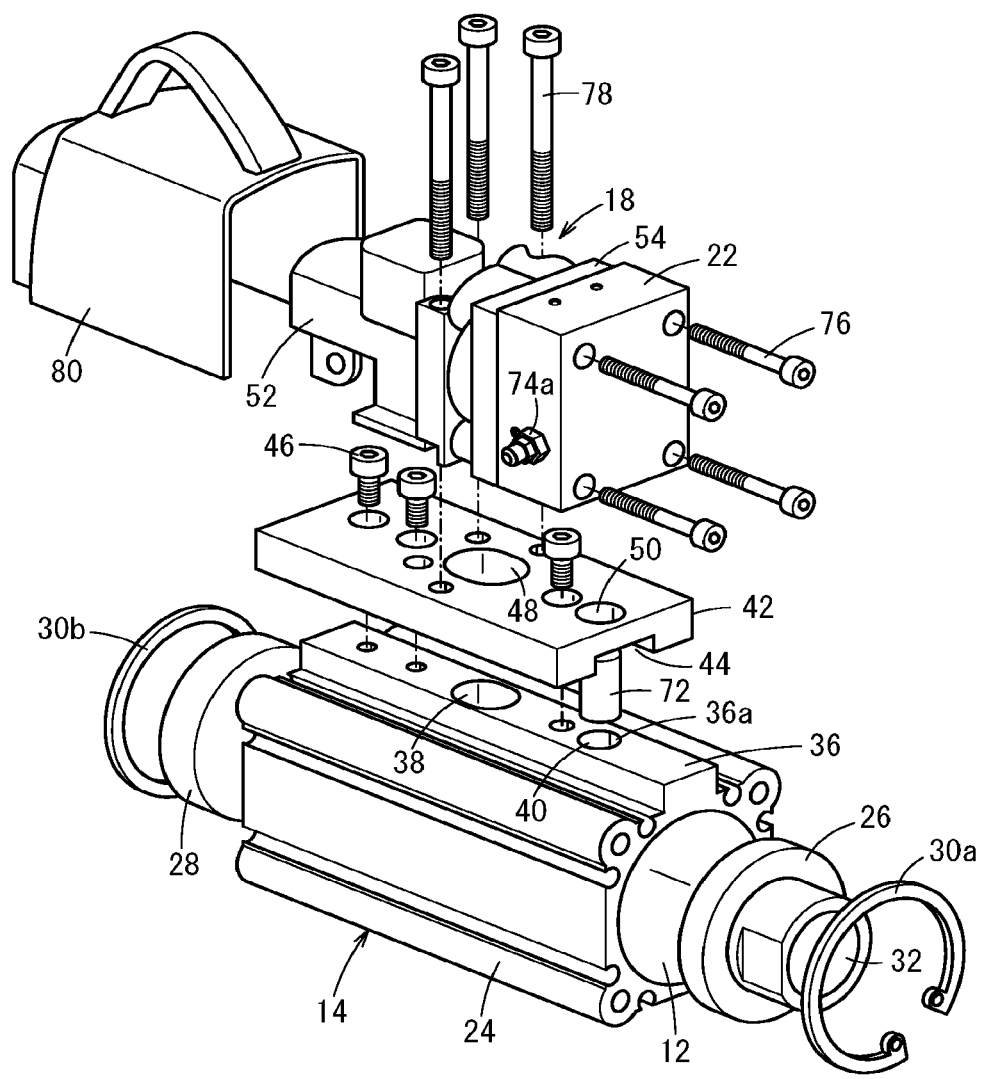
FIG. 4 is an exploded view in which the high-pressure fluid discharge device of FIG. 1 is broken down into predetermined components or component groups.
Figure 5:
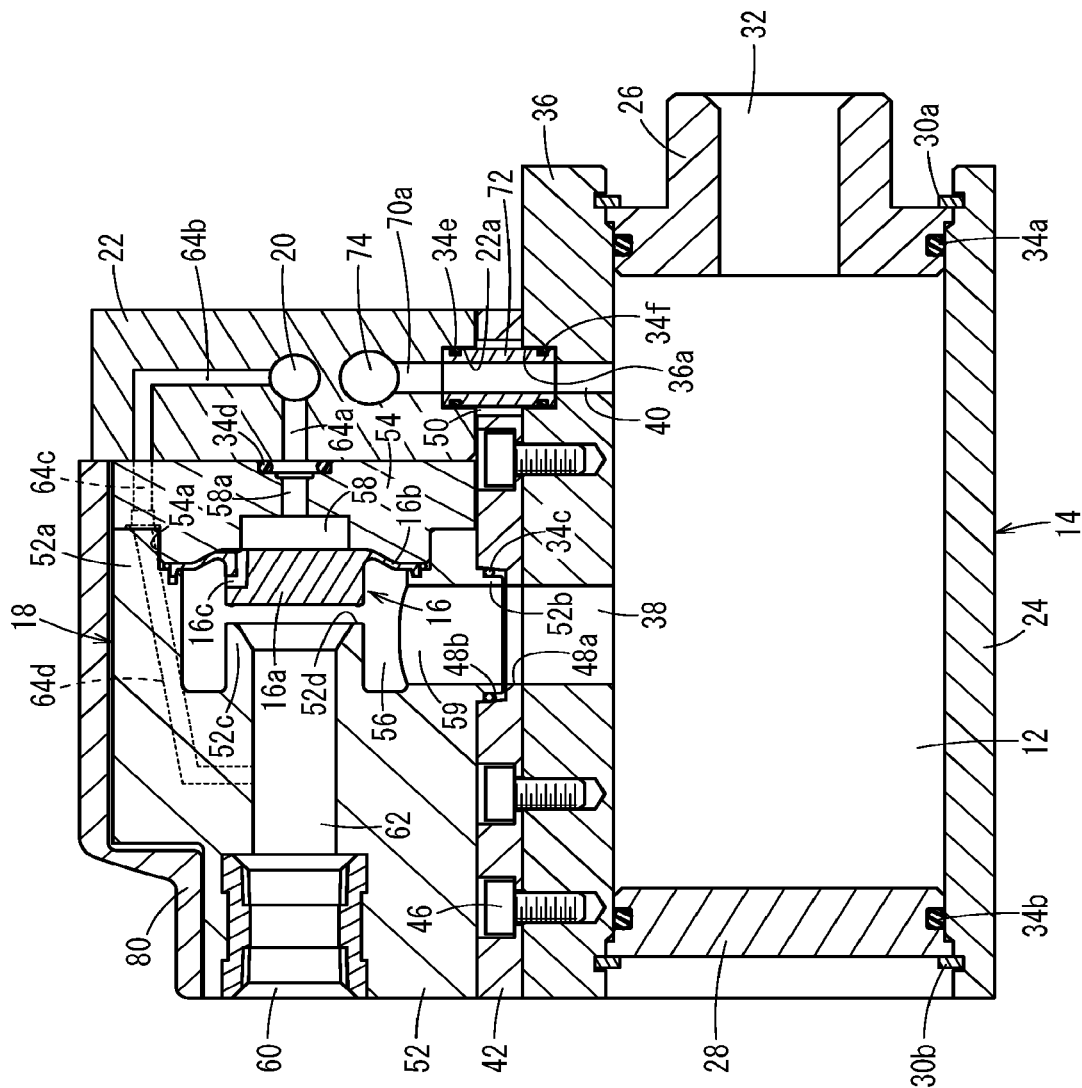
FIG. 5 is a view corresponding to FIG. 2 when the high-pressure fluid discharge device of FIG. 1 is in another operating state.
Figure 6:
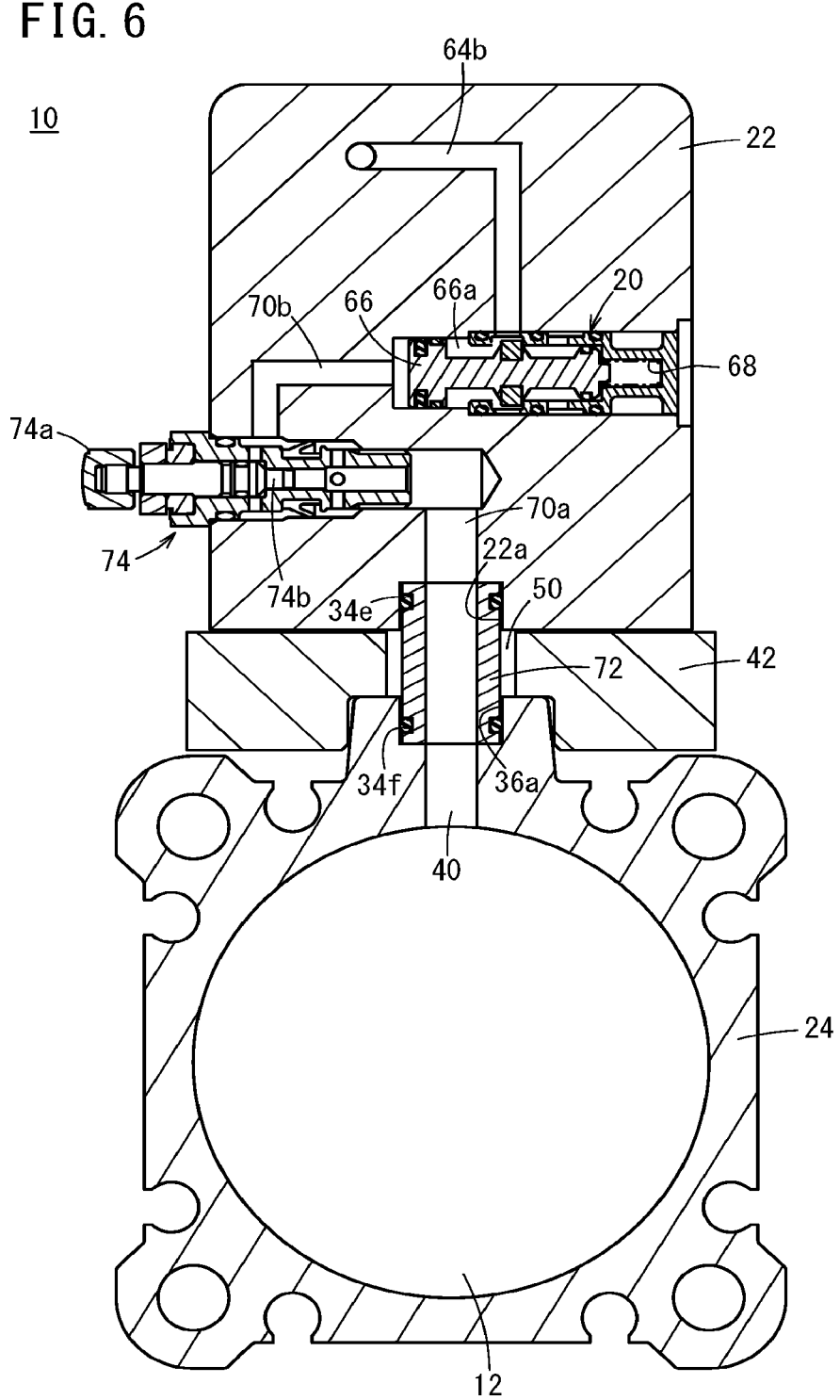
FIG. 6 is a view corresponding to FIG. 3 when the high-pressure fluid discharge device of FIG. 1 is in another operating state.

As shown in FIG. 4, the upper side wall of the cylinder tube 24 is provided with a pedestal portion 36 projecting upward. The pedestal portion 36 extends parallel to the axis of the cylinder tube 24. A discharge air supply port 38 penetrates through the upper side wall of the cylinder tube 24, and opens at the top of the pedestal portion 36. Further, an operating air supply port 40 for supplying air toward the opening and closing control valve 20 described later penetrates through the upper side wall of the cylinder tube 24. The operating air supply port 40 opens in a circular recess 36a formed in the top of the pedestal portion 36.

A connecting plate 42 for mounting the diaphragm housing 18 and the control housing 22 is arranged on an upper portion of the cylinder tube 24. The lower surface of the connecting plate 42 is provided with a recessed groove 44 matching the cross-sectional shape of the pedestal portion 36 of the cylinder tube 24. In a state where the pedestal portion 36 of the cylinder tube 24 is fitted into the recessed groove 44 of the connecting plate 42, the connecting plate 42 is fixed to the pedestal portion 36 by a plurality of first bolts 46.

The connecting plate 42 has a first hole 48 penetrating in the vertical direction at a position corresponding to the discharge air supply port 38 of the tank housing 14. The first hole 48 includes a lower passage forming portion 48a having a diameter equal to that of the discharge air supply port 38 and an upper fitting portion 48b having a diameter larger than that of the passage forming portion 48a. Further, the connecting plate 42 has a second hole 50 penetrating in the vertical direction at a position corresponding to the operating air supply port 40.

As shown in FIG. 2, the diaphragm housing 18 is formed by combining a first body 52 and a second body 54. The first body 52 and the second body 54 are butted against each other by fitting an annular convex portion 52a provided on the outer peripheral side of the right side surface of the first body 52 into an annular concave portion 54a provided on the outer peripheral side of the left side surface of the second body 54.

The diaphragm valve 16 has a thick main body portion 16a having a cylindrical shape and a flange 16b that is thinner than the main body portion 16a and is flexible. An outer peripheral edge portion of the flange 16b is sandwiched between the first body 52 and the second body 54.

The first body 52 has an annular valve chamber 56 defined by the diaphragm valve 16. The second body 54 has a pilot chamber 58 defined by the diaphragm valve 16. The interior of the main body portion 16a of the diaphragm valve 16 is provided with a pilot passage 16c for allowing the pilot chamber 58 to communicate with the valve chamber 56. One end of the pilot passage 16c opens at a side surface of the main body portion 16a that faces the valve chamber 56. The other end of the pilot passage 16c opens at an end surface of the main body portion 16a facing the pilot chamber 58.

The bottom surface of the first body 52 is provided with an annular projecting portion 52b projecting downward at a position corresponding to the discharge air supply port 38 of the tank housing 14. The bottom portion of the first body 52 including the projecting portion 52b has a connection passage 59 for connecting the discharge air supply port 38 to the valve chamber 56. The projecting portion 52b of the first body 52 is fitted into the fitting portion 48b of the first hole 48 of the connecting plate 42. The discharge air supply port 38 communicates with the valve chamber 56 via the passage forming portion 48a of the first hole 48 of the connecting plate 42 and the connection passage 59 of the first body 52. Reference numeral 34c denotes a seal member for sealing between the projecting portion 52b and the fitting portion 48b.

The first body 52 has a discharge port 60 opened on a side surface opposite to a side surface butted against the second body 54, and a discharge passage 62 communicating with the discharge port 60 and extending to the vicinity of the diaphragm valve 16. The first body 52 includes therein a tubular wall portion 52c that separates the valve chamber 56 and the discharge passage 62. The distal end of the tubular wall portion 52c constitutes a valve seat 52d. When the main body portion 16a of the diaphragm valve 16 is not in contact with the valve seat 52d, the discharge passage 62 communicates with the valve chamber 56. When the main body portion 16a of the diaphragm valve 16 is in contact with the valve seat 52d, communication between the discharge passage 62 and the valve chamber 56 is blocked.

The control housing 22 has a first release flow path 64a and a second release flow path 64b. The first release flow path 64a and the second release flow path 64b form a part of a flow path for releasing the air in the pilot chamber 58 toward the discharge passage 62. One end of the first release flow path 64a opens at a side surface of the control housing 22 that faces the diaphragm housing 18, and the one end is connected to an extension passage 58a extending from the pilot chamber 58. The other end of the first release flow path 64a is connected to the opening and closing control valve 20. Reference numeral 34d denotes a seal member for sealing a connection portion between the first release flow path 64a and the extension passage 58a from the outside.

The diaphragm housing 18 has a third release flow path 64c and a fourth release flow path 64d. The third release flow path 64c and the fourth release flow path 64d constitute the remaining portions of the flow path for releasing the air in the pilot chamber 58 toward the discharge passage 62. The third release flow path 64c is formed in the second body 54, and the fourth release flow path 64d is formed in the first body 52. One end of the fourth release flow path 64d is connected to the third release flow path 64c, and the other end of the fourth release flow path 64d is connected to the discharge passage 62.

One end of the second release flow path 64b formed in the control housing 22 is connected to the opening and closing control valve 20. The other end of the second release flow path 64b opens at the side surface of the control housing 22 facing the diaphragm housing 18 and is connected to the third release flow path 64c formed in the second body 54.

The opening and closing control valve 20 includes a spool 66 slidable between a position where the second release flow path 64b is connected to the first release flow path 64a and a position where the second release flow path 64b is blocked from the first release flow path 64a. The spool 66 receives the urging force of a spring 68 in one direction and receives the urging force of the air pressure of a second operating air flow path 70b described later in the opposite direction. The first release flow path 64a is always connected to a recess 66a formed in the outer peripheral surface of the spool 66.

When the air pressure in the second operating air flow path 70b is less than a predetermined value, the spool 66 moves to the position where the second release flow path 64b is blocked from the first release flow path 64a, by the biasing force of the spring 68 (see FIG. 3). At this time, the air in the pilot chamber 58 is confined. On the other hand, when the air pressure in the second operating air flow path 70b is equal to or higher than the predetermined value, the spool 66 moves, against the urging force of the spring 68, to the position where the second release flow path 64*b* is connected to the first release flow path 64*a* (see FIG. 6). At this time, the air in the pilot chamber 58 is released toward the discharge passage 62.

The control housing 22 has an operating air flow path with a speed controller 74 being installed in the path. The operating air flow path includes a first operating air flow path 70*a* located upstream of the speed controller 74 and the second operating air flow path 70*b* located downstream of the speed controller 74. The first operating air flow path 70*a* opens in a circular recess 22*a* formed in the bottom of the control housing 22. The second operating air flow path 70*b* is connected to the opening and closing control valve 20.

A cylindrical sleeve 72 is inserted into the second hole 50 of the connecting plate 42. The sleeve 72 is supported between the circular recess 22*a* formed in the control housing 22 and the circular recess 36*a* formed in the pedestal portion 36 of the cylinder tube 24. The operating air supply port 40 of the cylinder tube 24 communicates with the first operating air flow path 70*a* via a passage formed inside the sleeve 72. On the outer periphery of the sleeve 72, a seal member 34*e* abutting against the wall surface of the circular recess 22*a* of the control housing 22 and a seal member 34*f* abutting against the wall surface of the circular recess 36*a* of the pedestal portion 36 of the cylinder tube 24 are mounted.

The speed controller 74 is a variable flow rate control valve capable of adjusting the flow rate of air flowing through the operating air flow path. The flow rate of air passing through the speed controller 74 can be adjusted by operating a knob 74*a* of the speed controller 74 to thereby set a needle 74*b* provided inside the speed controller 74, to a desired position. The flow rate of the air passing through the speed controller 74 determines the rising speed of the pressure of the air in the second operating air flow path 70*b* acting on the spool 66 of the opening and closing control valve 20 when the air pressure in the tank chamber 12 rises.

The first body 52, the second body 54, and the control housing 22 are connected in series by a plurality of second bolts 76. The first body 52 is connected to the connecting plate 42 by a plurality of third bolts 78. As a result, the diaphragm housing 18 constituted by the first body 52 and the second body 54 and the control housing 22 are integrally connected to the connecting plate 42. Reference numeral 80 denotes a cover body that covers the diaphragm housing 18.

The high-pressure fluid discharge device 10 according to the first embodiment of the present invention is basically configured as described above. Hereinafter, the operation will be described with reference to FIGS. 2 to 7.

As shown in FIGS. 2 and 3, a state in which the main body portion 16*a* of the diaphragm valve 16 abuts against the valve seat 52*d* and the spool 66 of the opening and closing control valve 20 is at a position at which the second release flow path 64*b* is blocked from the first release flow path 64*a* is referred to as an initial state. That is, a state in which both the diaphragm valve 16 and the opening and closing control valve 20 are closed is defined as an initial state. At this time, although the high-pressure air is not sufficiently stored in the tank chamber 12, the pressure of the air in the valve chamber 56 and the pilot chamber 58 communicating with each other via the pilot passage 16*c* is higher than the pressure of the air in the discharge passage 62.

When the high-pressure air is supplied to the tank chamber 12 through the inlet port 32 from the initial state, the pressure of the air in the tank chamber 12 increases. Part of the air enters the valve chamber 56 through the discharge air supply port 38, the passage forming portion 48*a* of the first hole 48 of the connecting plate 42, and the connection passage 59 of the first body 52, and then enters the pilot chamber 58 through the pilot passage 16*c*. Therefore, the pressure of the air in the valve chamber 56 and the pilot chamber 58 continues to be higher than the pressure of the air in the discharge passage 62, and the diaphragm valve 16 is kept closed.

Another part of the air in the tank chamber 12 flows toward the speed controller 74 through the operating air supply port 40, the inside of the sleeve 72, and the first operating air flow path 70*a*. Here, the flow rate of the air passing through the speed controller 74, that is, the flow rate of the air flowing into the second operating air flow path 70*b* is limited to a flow rate corresponding to the position of the needle 74*b* of the speed controller 74. Therefore, the pressure of the air in the second operating air flow path 70*b* acting on the opening and closing control valve 20 increases at a speed corresponding to the limited flow rate.

When the pressure of the air in the second operating air flow path 70*b* becomes equal to or higher than a predetermined value, the spool 66 of the opening and closing control valve 20 moves against the urging force of the spring 68, and the second release flow path 64*b* is connected to the first release flow path 64*a*. That is, the opening and closing control valve 20 is opened (see FIG. 6). Thus, the air in the pilot chamber 58 sequentially flows through the first release flow path 64*a* to the fourth release flow path 64*d* and reaches the discharge passage 62.

When the air in the pilot chamber 58 is released, the pressure of the air in the pilot chamber 58 decreases, and the main body portion 16*a* of the diaphragm valve 16 separates from the valve seat 52*d*. That is, the diaphragm valve 16 opens (see FIG. 5). Then, the air supplied to and stored in the tank chamber 12 through the inlet port 32 enters the valve chamber 56 through the discharge air supply port 38, the passage forming portion 48*a* of the first hole 48 of the connecting plate 42, and the connection passage 59 of the first body 52. Thereafter, the air flows into the discharge passage 62 at once and is discharged from the discharge port 60 to the outside.

When the air stored in the tank chamber 12 is discharged to the outside, the pressure of the air in the tank chamber 12 decreases, and the pressure of the air in the second operating air flow path 70*b* acting on the spool 66 of the opening and closing control valve 20 also decreases. When a predetermined amount of air stored in the tank chamber 12 is discharged, the pressure of the air in the second operating air flow path 70*b* becomes lower than the predetermined value. As a result, the spool 66 is moved by the urging force of the spring 68, and the second release flow path 64*b* is blocked from the first release flow path 64*a*. That is, the opening and closing control valve 20 is closed.

When the opening and closing control valve 20 is closed, the releasing of the air in the pilot chamber 58 is stopped. Further, since the air from the valve chamber 56 flows into the pilot chamber 58 via the pilot passage 16*c*, the pressure of the air in the pilot chamber 58 increases. On the other hand, since the air in the valve chamber 56 and the discharge passage 62 that communicate with each other is discharged from the discharge port 60 to the outside, the pressure of the air in the pilot chamber 58 becomes higher than the pressure of the air in the valve chamber 56 and the discharge passage 62. As a result, the main body portion 16*a* of the diaphragm valve 16 comes into contact with the valve seat 52*d*, and the diaphragm valve 16 is closed. Therefore, the discharge of air from the discharge port 60 is stopped, and the state returns to the initial state.

While the high-pressure air is supplied to the tank chamber 12 through the inlet port 32, the above-described operations are repeatedly performed. That is, a series of operations of "opening the opening and closing control valve 20"→"opening the diaphragm valve 16"→"discharging the air stored in the tank chamber 12 to the outside from the discharge port 60"→"closing the opening and closing control valve 20"→"closing the diaphragm valve 16"→"stopping the discharge of the air from the discharge port 60" are periodically repeated.

Figure 7:
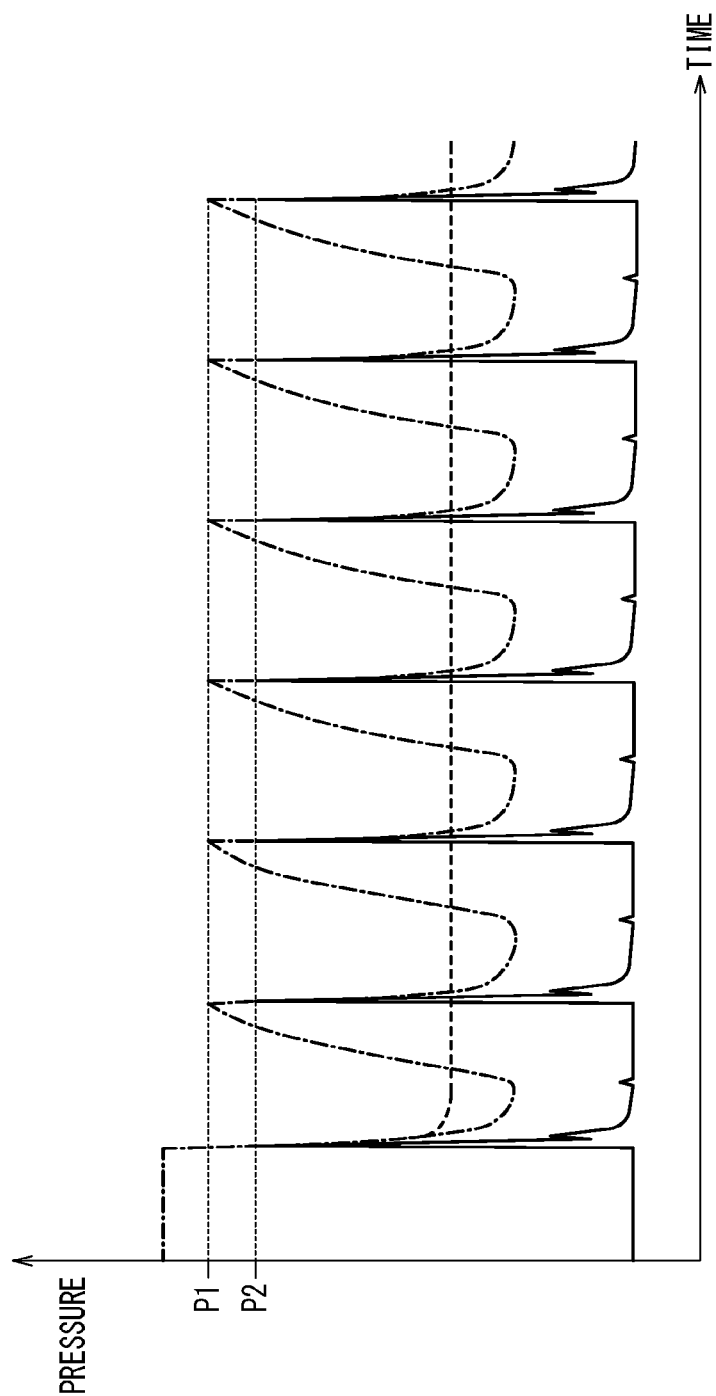
FIG. 7 is a diagram showing how the pressure of the fluid in the tank chamber and the discharge port of the high-pressure fluid discharge device of FIG. 1 changes.

FIG. 7 shows how the air pressure in the tank chamber 12 and the air pressure in the discharge port 60 change when the above-described series of operations are periodically repeated. The pressure of the air in the tank chamber 12 is indicated by a one dot chain line, and the pressure of the air in the discharge port 60 is indicated by a solid line. For comparison with a case where the normal continuous air blow is performed, the discharge pressure in the continuous air blow is indicated by a dotted line.

When the air pressure in the tank chamber 12 rises and reaches a predetermined value P1, the air pressure in the discharge port 60 instantaneously rises to a high peak value (peak pressure) P2, and then the air pressure in the discharge port 60 and the air pressure in the tank chamber 12 drop. This operation is periodically repeated.

The period in this case depends on the air flow rate set by the speed controller 74. Specifically, when the position of the needle 74b is changed by operating the knob 74a of the speed controller 74 and the flow path area around the needle 74b is reduced, the period becomes longer. The peak pressure P2 at the discharge port 60 depends on the strength of the spring 68 of the opening and closing control valve 20. The stronger the spring 68 (the greater the spring constant), the greater the peak pressure P2.

By the intermittent air blow having a high peak pressure P2, cutting chips can be effectively removed from the surfaces of the workpieces, and the consumption amount of air is remarkably small as compared with the continuous air blow.

According to the high-pressure fluid discharge device 10 of the present embodiment, air having a high peak pressure P2 can be periodically discharged from the discharge port 60 merely by continuously supplying high-pressure fluid through the inlet port 32.

In the present embodiment, high-pressure air is used as the high-pressure fluid. However, the fluid to be used is not limited to air and may be another fluid as long as it is a compressible fluid. In addition, although the speed controller is provided in the present embodiment, the speed controller need not necessarily be provided when it is not necessary to adjust the period.

Second Embodiment

Next, a high-pressure fluid discharge device 90 according to a second embodiment of the present invention will be described with reference to FIGS. 8 and 9. In the high-pressure fluid discharge device 90 according to the second embodiment, the same or equivalent components as those of the high-pressure fluid discharge device 10 described above are denoted by the same reference numerals, and detailed description thereof will be omitted.

The high-pressure fluid discharge device 90 is attached to a spindle 82 of a machining center, and is used to remove chips adhering to the surface of the workpiece. For reference, FIG. 9 shows a state in which an end mill (tool) 84 is mounted on the spindle 82 of the machining center via a tool holder 94.

Figure 8:
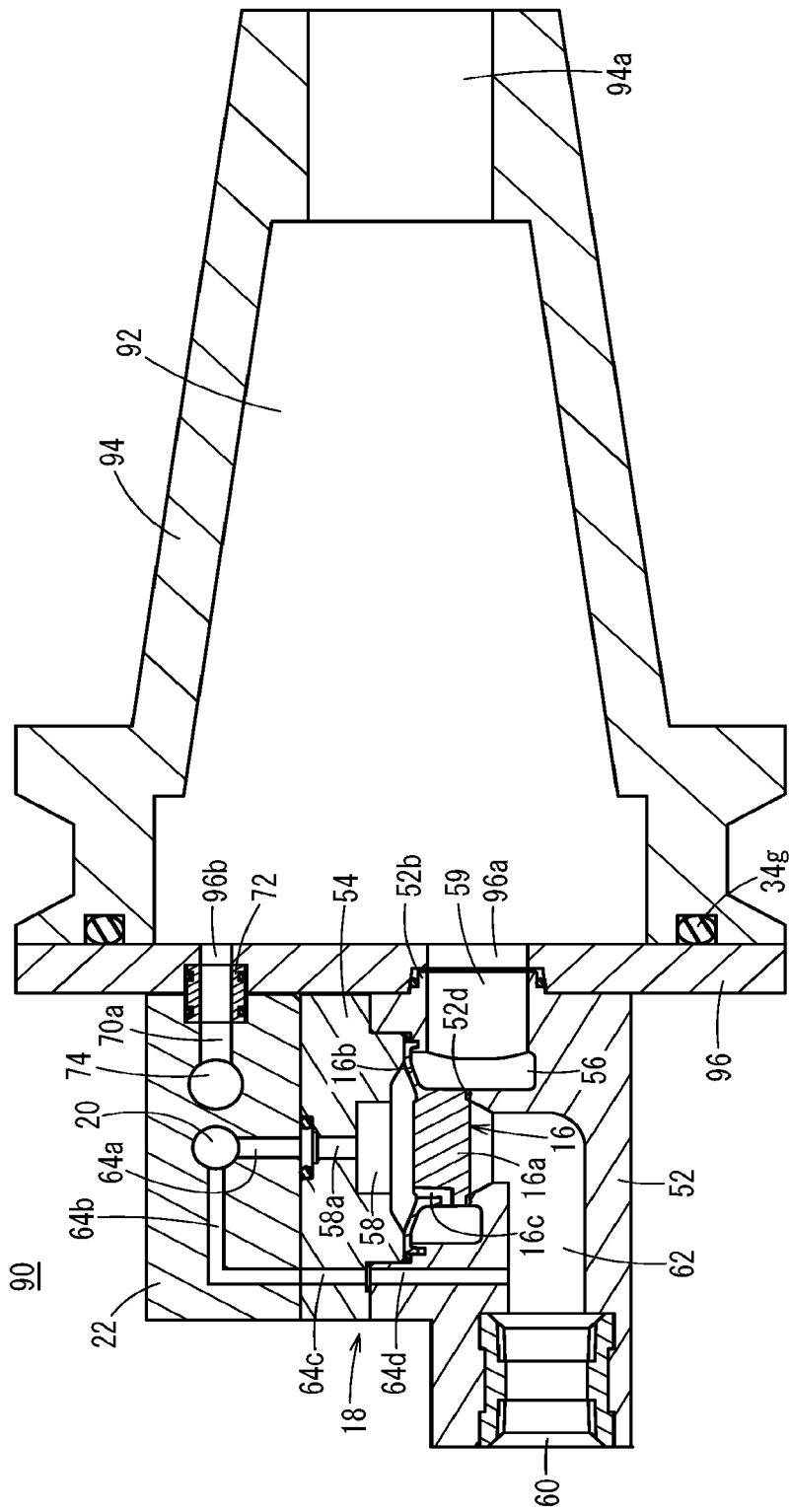
FIG. 8 is a cross-sectional view of a high-pressure fluid discharge device according to a second embodiment of the present invention.
Figure 9:
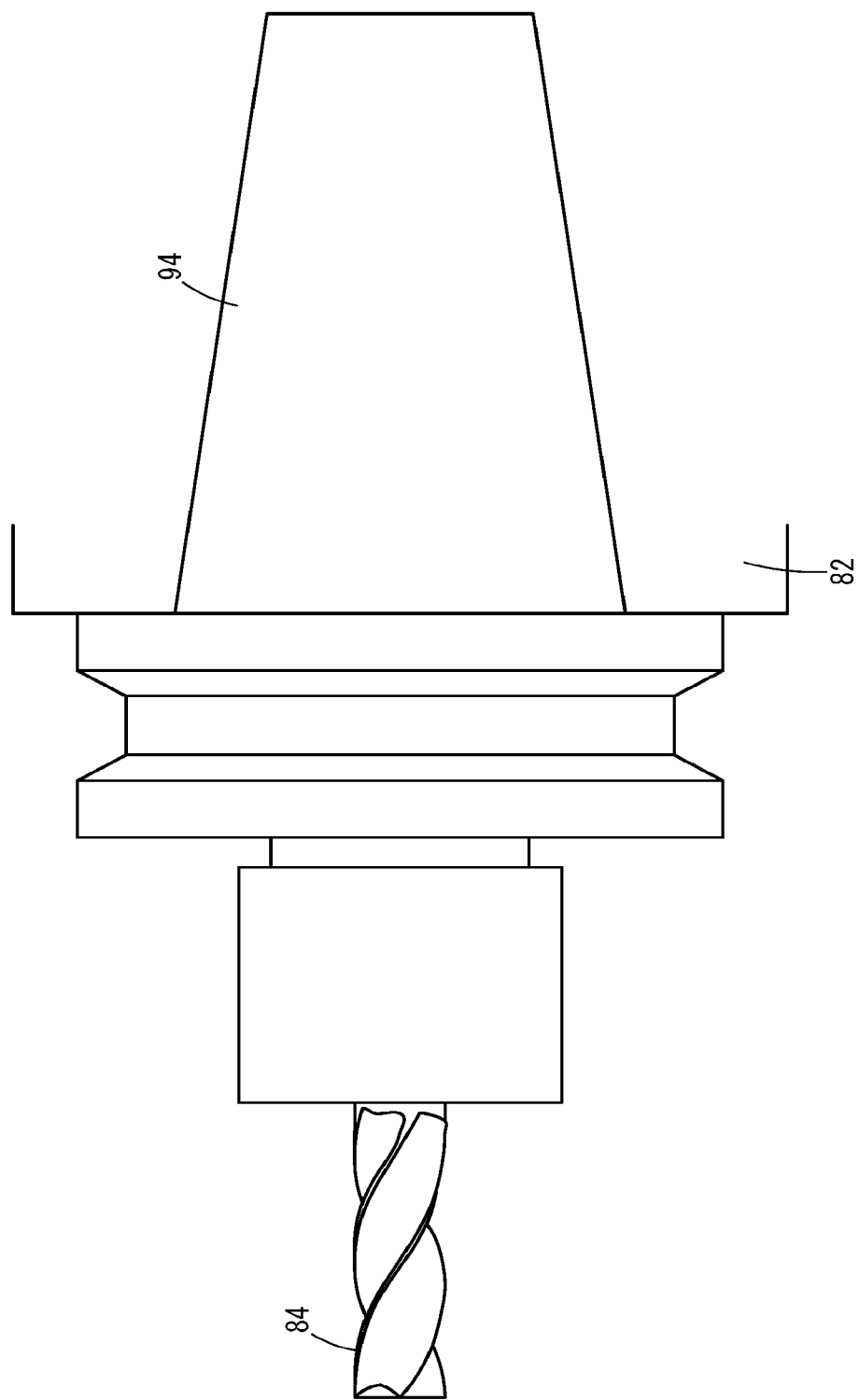
FIG. 9 is a view showing a main part of a machining center to which the high-pressure fluid discharge device of FIG. 8 is attached.

As shown in FIG. 8, the high-pressure fluid discharge device 90 includes a hollow conical tool holder 94 in which a tank chamber 92 is formed, the diaphragm housing 18 incorporating the diaphragm valve 16, and the control housing 22 incorporating the opening and closing control valve 20.

The tool holder 94 is one of a plurality of tool holders which are attached to the spindle 82 of the machining center. In other words, the high-pressure fluid discharge device 90 includes, as a part of the configuration, an empty tool holder from among a plurality of tool holders used for mounting a tool such as an end mill in a machining center, and uses the internal space thereof as the tank chamber 92.

As shown in FIG. 8, the tool holder 94 includes an inlet port 94a on one end side in the axial direction thereof. A plate-shaped cover plate 96 that forms a wall surface of the tank chamber 92 together with an inner wall surface of the tool holder 94 is attached to the other end side of the tool holder 94 in the axial direction. A seal member 34g for sealing the tank chamber 92 from the outside is attached to an end surface of the tool holder 94 that contacts the cover plate 96.

The cover plate 96 has a discharge air supply port 96a and an operating air supply port 96b, which penetrate through a wall surface thereof. The diaphragm housing 18 and the control housing 22 are mounted on a surface of the cover plate 96 opposite to a surface against which the tool holder 94 abuts.

On the right side surface of the first body 52 constituting a part of the diaphragm housing 18, an annular projecting portion 52b projecting rightward is provided at a position corresponding to the discharge air supply port 96a of the cover plate 96. The projecting portion 52b is fitted to the cover plate 96. The discharge air supply port 96a communicates with the valve chamber 56 via a connection passage 59 provided in the right side surface portion of the first body 52 including the projecting portion 52b.

A sleeve 72 is disposed between the control housing 22 and the cover plate 96 at a position corresponding to the operating air supply port 96b of the cover plate 96. The operating air supply port 96b of the cover plate 96 communicates with the first operating air flow path 70a of the control housing 22 via a passage inside the sleeve 72.

The first body 52 has a discharge port 60 opened on the left side surface of the first body 52 and a discharge passage 62 communicating with the discharge port 60 and extending to the vicinity of the diaphragm valve 16. The discharge port 60 and the discharge passage 62 extend parallel to the axial direction of the tool holder 94.

The control housing 22 includes a first release flow path 64a and a second release flow path 64b as flow paths for releasing the air in the pilot chamber 58 toward the discharge passage 62. The diaphragm housing 18 includes a third release flow path 64c and a fourth release flow path 64d. The third release flow path 64c and the fourth release flow path 64d are arranged in one straight line and extend in a direction perpendicular to the discharge passage 62.

Also in the high-pressure fluid discharge device 90 of the present embodiment, as in the previously-described high-pressure fluid discharge device 10, while high-pressure air is supplied to the tank chamber 92 through the inlet port 94a, a series of operations of "opening of the opening and closing control valve 20"→"opening of the diaphragm valve 16"→"discharge of air stored in the tank chamber 92 to the outside from the discharge port 60"→"closing of the opening and closing control valve 20"→"closing of the diaphragm valve 16"→"stopping of discharge of air from the discharge port 60" are periodically repeated. By periodically discharging air having a high pressure peak value from the discharge port 60, chips adhering to the surface of a workpiece (not shown) that is positioned in front of the discharge port 60 are effectively removed.

The high-pressure fluid discharge device 90 of the present embodiment includes, as a part of the configuration, the tool holder 94 attached to the spindle 82 of the machining center, and uses the internal space thereof as the tank chamber 92, and thus attachment to the machining center is easy and the configuration is simplified as much as possible. Moreover, the tool holder is a standardized member, and accordingly the high-pressure fluid discharge device 90 of the same specification can be applied to various machining centers.

The high-pressure fluid discharge device according to the present invention is not limited to the above-described embodiment, and various configurations can be adopted without departing from the essence and gist of the present invention.

The invention claimed is:

1. A pressurized fluid discharge device comprising an inlet port to which a pressurized fluid is supplied, a tank chamber configured to store the pressurized fluid, and a discharge port configured to discharge the pressurized fluid, wherein:
   the pressurized fluid discharge device further comprises a diaphragm valve configured to separate a pilot chamber and a valve chamber communicating with the tank chamber;
   the pilot chamber communicates with the valve chamber through a pilot passage provided inside the diaphragm valve;
   when the diaphragm valve opens, the valve chamber communicates with the discharge port through a discharge passage;
   the pressurized fluid discharge device further comprises an opening and closing control valve provided in a release flow path and configured to open the pilot chamber to the discharge passage in a state where the diaphragm valve is closed; and
   the opening and closing control valve is operated to open and close by a pressure of fluid that is supplied from the tank chamber through an operating air flow path without passing through the valve chamber.

2. The pressurized fluid discharge device according to claim 1, wherein a speed controller is provided in the operating air flow path for fluid for opening and closing the opening and closing control valve.

3. The pressurized fluid discharge device according to claim 1, further comprising:
   a tank housing in which the tank chamber is formed;
   a diaphragm housing incorporating the diaphragm valve; and
   a control housing incorporating the opening and closing control valve.

4. The pressurized fluid discharge device according to claim 3, wherein a connecting plate configured to mount the diaphragm housing and the control housing is disposed on a cylinder tube constituting the tank housing.

5. The pressurized fluid discharge device according to claim 1, further comprising:
   a tool holder containing the tank chamber thereinside, a diaphragm housing incorporating the diaphragm valve, and a control housing incorporating the opening and closing control valve.

6. The pressurized fluid discharge device according to claim 5, wherein the tool holder includes the inlet port on one end side of the tool holder in an axial direction thereof, a cover plate is attached to another end side of the tool holder in the axial direction, and the diaphragm housing and the control housing are attached to the cover plate.

7. The pressurized fluid discharge device according to claim 1, wherein the pressurized fluid is pressurized air.

* * * * *